United States Patent
McFeat et al.

(10) Patent No.: US 7,628,587 B2
(45) Date of Patent: Dec. 8, 2009

(54) GAS TURBINE BLADE SHROUD

(75) Inventors: Jose Anguisola McFeat, Waldshut-Tiengen (DE); Ingolf Schulz, Baden (CH); Dirk Wilhelm, Zurich (CH)

(73) Assignee: Alstom Technology Ltd, Baden (CH)

( * ) Notice: Subject to any disclaimer, the term of this patent is extended or adjusted under 35 U.S.C. 154(b) by 137 days.

(21) Appl. No.: 11/589,262

(22) Filed: Oct. 30, 2006

(65) Prior Publication Data

US 2008/0019835 A1    Jan. 24, 2008

Related U.S. Application Data

(63) Continuation of application No. PCT/EP2005/051720, filed on Apr. 19, 2005.

(30) Foreign Application Priority Data

Apr. 30, 2004  (EP)  ................... 04101875

(51) Int. Cl.
*B63H 1/16* (2006.01)
(52) U.S. Cl. .............. 416/189; 415/173.5; 415/173.6; 415/173.1; 416/191; 416/192; 416/241 R
(58) Field of Classification Search ............ 415/173.1, 415/173.5, 173.6; 416/189, 191, 192, 241 R
See application file for complete search history.

(56) References Cited

U.S. PATENT DOCUMENTS

| | | | |
|---|---|---|---|
| 3,576,377 A * | 4/1971 | Beanland et al. | 416/191 |
| 4,148,494 A * | 4/1979 | Zelahy et al. | 277/415 |
| 4,243,360 A * | 1/1981 | Wright | 416/191 |
| 4,326,836 A * | 4/1982 | Fitton | 416/196 R |
| 4,948,338 A * | 8/1990 | Wickerson | 416/92 |
| 5,167,485 A * | 12/1992 | Starkweather | 415/115 |
| 5,460,486 A | 10/1995 | Evans et al. | |

(Continued)

FOREIGN PATENT DOCUMENTS

DE     103 36 863 A1    3/2004

(Continued)

OTHER PUBLICATIONS

International Search Report.

(Continued)

*Primary Examiner*—Igor Kershteyn
(74) *Attorney, Agent, or Firm*—Buchanan Ingersoll & Rooney PC

(57) ABSTRACT

A gas turbine blade shroud includes a platform and one or more fins extending toward a stator and side rails that extend radially toward the stator and along the edge of the platform. The increased wall thickness in the side regions of the blade shroud effects an increase in stiffness and a decrease in deformation during turbine operation. Due to a localised increase in wall thickness the mass of the blade shroud can be minimized such that mechanical loading is not significantly increased. The side rails can improve a lining up of adjacent blades and decrease a probability of hot gas leakage into the cavity between blade shroud and stator. The side rails have profile shapes that can be optimised in view of stiffness and mechanical loading and are suitable for casting. The blade shroud with side rails can have an improved life time.

20 Claims, 3 Drawing Sheets

U.S. PATENT DOCUMENTS

| | | | |
|---|---|---|---|
| 5,823,741 A * | 10/1998 | Predmore et al. | 415/134 |
| 5,971,710 A * | 10/1999 | Stauffer et al. | 416/191 |
| 6,491,498 B1 | 12/2002 | Seleski et al. | |
| 7,001,152 B2 * | 2/2006 | Paquet et al. | 416/190 |
| 2002/0127111 A1 * | 9/2002 | Tomita et al. | 416/241 B |

FOREIGN PATENT DOCUMENTS

| | | |
|---|---|---|
| EP | 1 083 299 A2 | 3/2001 |
| EP | 1331361 A1 * | 7/2003 |
| EP | 1 413 712 A1 | 4/2004 |
| GB | 1426049 A | 2/1976 |

OTHER PUBLICATIONS

European Search Report.

* cited by examiner

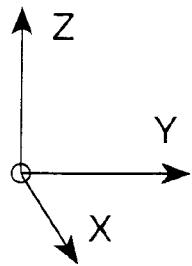
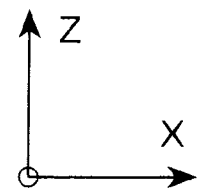
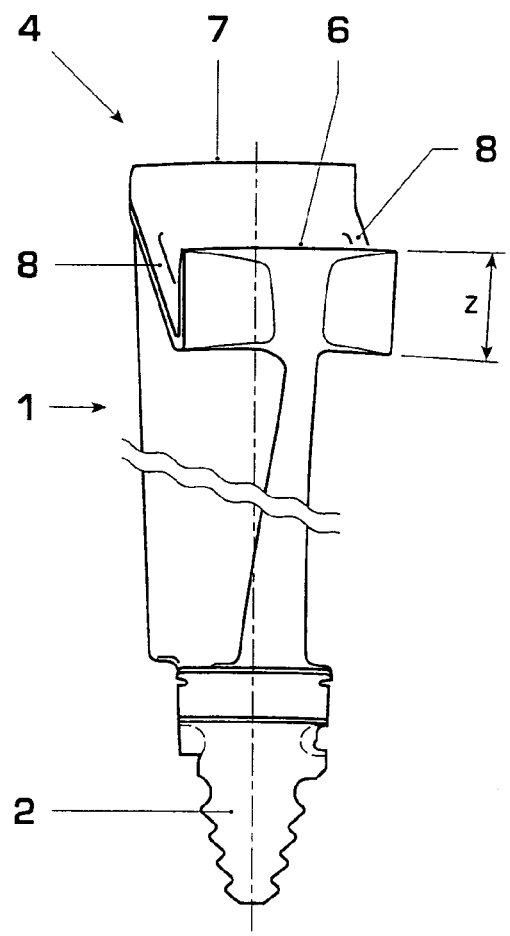
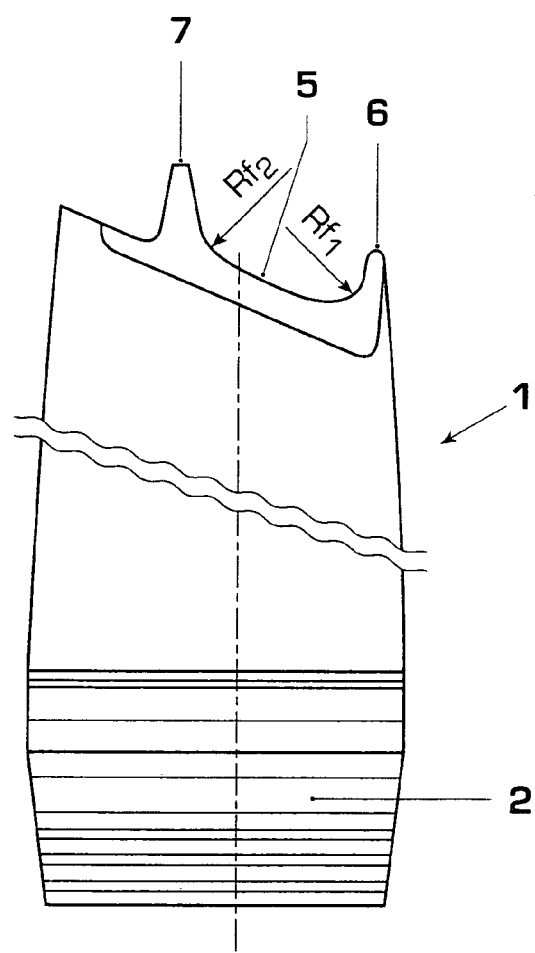
Fig. 1                    Fig. 6

GAS TURBINE BLADE SHROUD

RELATED APPLICATIONS

This application is based on and claims priority under 35 U.S.C. §119 to European Application No. 04101875.5, filed Apr. 30, 2004 and is a continuation application under 35 U.S.C. §120 of International Application No. PCT/EP2005/051720, filed Apr. 19, 2005 designating the U.S., the entire contents of both of which are hereby incorporated by reference.

TECHNICAL FIELD

Background

A gas turbine blade shroud and an improvement in regard to its mechanical stiffness and component lifetime are disclosed. Gas turbine blades comprise blade shrouds in order to control and minimise leakage flow between blade tips and stator as well as to limit vibration amplitudes. A blade shroud typically comprises a platform extending in a plane essentially parallel to the stator opposite the blade tip and one or more fins, which extend circumferentially and radially outward toward the stator. The platform of a blade shroud can be shaped such that its edges are parallel to those of an adjacent blade shroud platform. In order to withstand high thermal load during gas turbine operation the blade shroud can be cooled by means of a cooling fluid passed through a cooling system within the platform of the shroud that is fluidly connected to a hollow cooling chambers in the blade interior. A blade shroud of this type is disclosed for example in EP 1083299.

The design of blade shrouds is currently geared to maximising the shroud lifetime while minimising cost. The shroud lifetime is limited by the mechanical stresses caused by centrifugal forces. Such stresses are currently reduced by minimising the wall thickness of the platform, also known as shroud web. However, a blade shroud with a thin wall thickness may not line up with the blade shroud of the adjacent blade due to manufacturing and assembly tolerances, which occur even if the tolerances are kept at a minimum. A further mismatch results from deformations of the shroud platform during turbine operation due to thermal and mechanical loading. A mismatch between two adjacent blade shrouds allows hot gas to enter the cavity between stator and blade shroud. The shroud can be designed with materials having a creep resistance and oxidation resistance up to a temperature less than the temperature of the hot gas. Hot gas ingestion therefore can cause premature failure of the shroud and the adjacent static and moving components.

SUMMARY

A gas turbine blade shroud is disclosed that can resolve the problems in connection with a mismatch of adjacent blade shrouds and that can have an improved lifetime.

An exemplary gas turbine blade shroud comprises a platform extending for example in the plane essentially matching the contour of the stator opposite the blade tip and, comprises side rails that extend radially and along one or both edges of the platform that face the platform of an adjacent gas turbine blade shroud.

An increase of the wall thickness results in an increase of the stiffness of the component according to the third power of the wall thickness. The blade shroud can have an increased wall thickness that is limited to the side regions of the platform. Thus the benefits of increased stiffness can be achieved and a resulting decrease in deformation and bending in the radial outward direction with time of turbine operation. However, the increase in wall thickness can be localised such that it causes no significant increase in the mass of the shroud and no significant increase of the mechanical loading.

A sufficient overlap of side rails of adjacent blade shroud platforms can have the further advantage that the pressure radially outside of the shroud remains higher compared to the pressure on the hot gas side of the shroud. This can prevent hot gas ingestion into the shroud cavity and therefore increases cooling effectiveness.

While the wall thickness in the side regions is increased, the wall thickness of the main body of the shroud platform can be kept small thus keeping the need for cooling of the platform at a minimum.

The side rails design can have the further advantage that a mismatch between adjacent blade shrouds is less likely to occur due to the increased dimensions in the radial direction.

The shape and profile of the side rails can be designed according to the following parameters: radial height that directly affects the stiffness, the mass that is to be kept at a minimum, manufacturing such that the component can be subsequently machined.

Shape and size of the blade shroud are given to the following embodiments:

A first exemplary embodiment of the blade shroud comprises a side rail with a profile in the shape of half circle or a quarter of a circle.

A second exemplary embodiment comprises a side rail with a rectangular profile shape.

A third exemplary embodiment comprises a side rail having a trapezoidal profile.

In these exemplary embodiments the width to height ratios as well as radii of curvatures can be within desired ranges.

They can be chosen in view of the increase of the stiffness as a function of height and width of the rail.

In a further exemplary embodiment of the blade shroud, the profile shape of the circumferentially extending fins are such that there is a smooth transition from a fin to a side rail.

BRIEF DESCRIPTION OF THE DRAWINGS

FIG. 1 shows perspective view of an exemplary gas turbine blade with a blade shroud having fins and side rails.

FIG. 6 shows a side view of the exemplary blade shroud and the transitions from the fins to the side rails.

DETAILED DESCRIPTION

Figure 2:
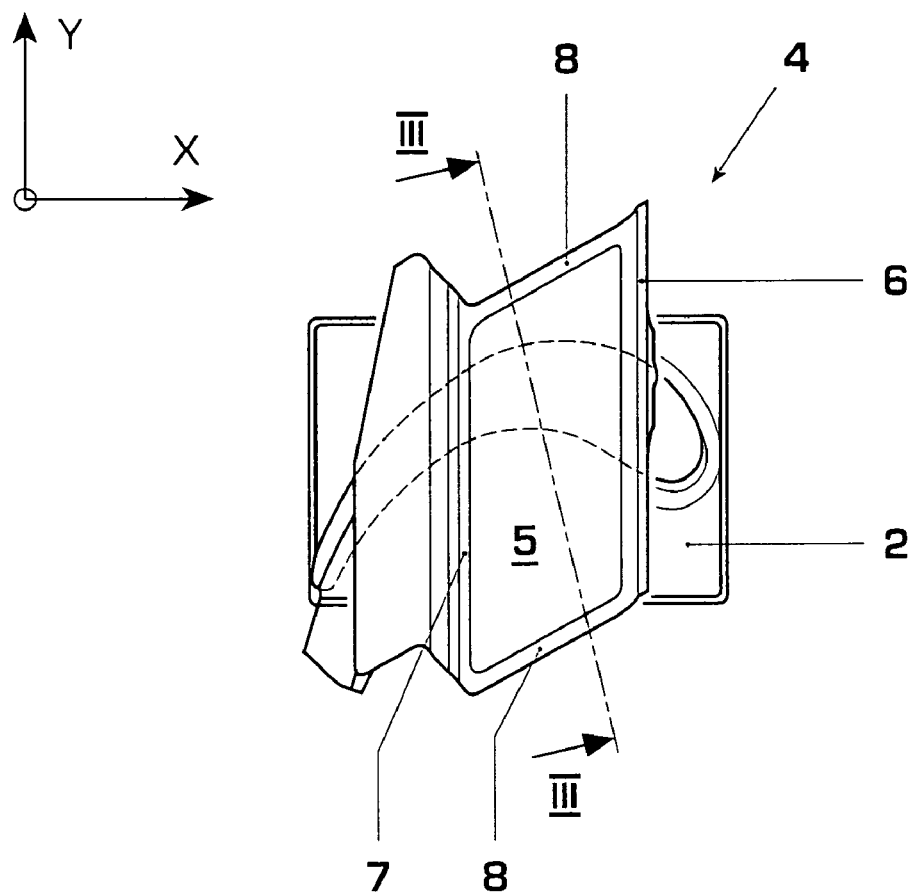
FIG. 2 shows a top view of the exemplary blade shroud.

FIGS. 1 and 6 show an exemplary gas turbine blade 1 comprising a blade root 2, the blade extending from the root 2 to a blade tip, and a blade shroud 4 arranged on the tip having a platform 5 and extending essentially parallel to a component opposite the blade tip in the radial direction z. The shroud comprises a first and second fin 6 and 7 extending in the radial direction z and in a tangential direction y with respect to a rotor (not shown) of the gas turbine. A side rail 8 extends essentially axially in the x-direction between the forward and aft fin 6 and 7. The side rails 8 are adjacent to the side rails of adjacent blades in the tangential direction y. Due to the side rails extending in height above the plane of the platform the radial overlap of adjacent blade shrouds is increased over the overlap of blade shrouds without side rails. For example, a platform may have a thickness of a few mm. The tolerance for the length of the manufactured blade in addition to the tolerance for the mounting of the blade on the rotor amounts to tolerance for the radial position of the blade shroud of a few mm. Hence, a blade shroud with no side rail and minimized tolerances may not line up with the adjacent blade shroud such that a mismatch or gap develops between them through which hot gas can leak into the cavity outside of the blade shroud. Such gas can cause damage and shortened lifetime of the blade shroud. A side rail of a given height can therefore provide an increased overlap in the presence of the said tolerances and assure that no gas leakage can occur. The fins 6 and 7 have a given height z, which is, for example, in a given ratio to the height of the side rails as shown in FIG. 2.

FIG. 2 shows a top view of the blade shroud 4 looking in the radial inward direction toward the rotor. It shows the exemplary blade shroud platform 5, fins 6 and 7 as well as the side rails 8.

Figure 3:
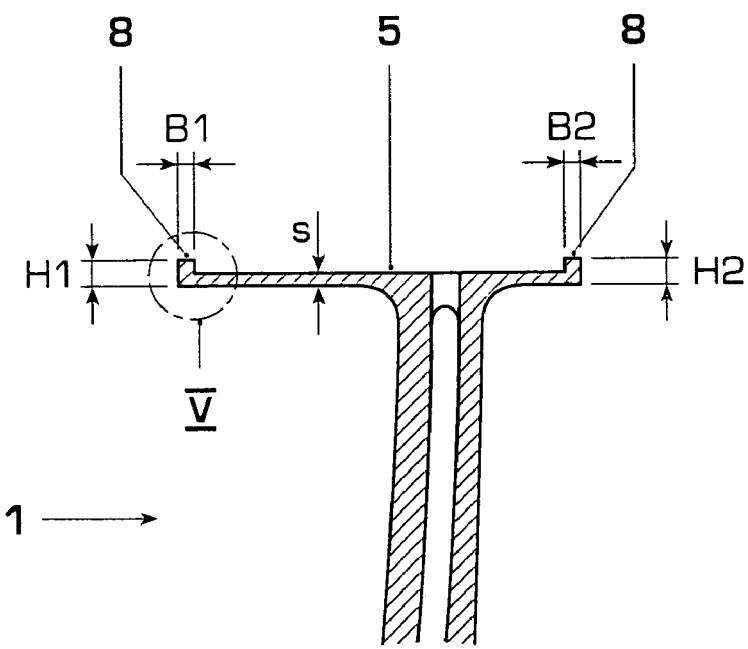
FIG. 3 shows a cross-sectional view of the exemplary blade shroud according to III-III in FIG. 2.

FIG. 3 shows the blade shroud 4 in cross-section III-III indicated in FIG. 2 and side rails 8 each having a rectangular profile, according to a first exemplary embodiment, with given widths B1 and B2 and given heights H1 and H2. The platform thickness s is, as already mentioned, in the range of, for example, a few millimeters, for example between 0.8 and 4 mm, or lesser or greater, in order to minimize the mass of the shroud and resulting centrifugal forces. The ratio of height to width, for example H1/B1, can be in the range between 1 and 5, or lesser or greater, and preferably 2 for the given platform thickness s. The ratio of height to width may vary with different values for s. The stiffness of the component can increase with the third power of the thickness, or in this case of the height of the side rail. It also can increase linearly with the width of the side rail. A ratio of 2 represents an exemplary optimal value in order to prevent a bending of the side rails in a sideways tangential direction and in the radial outward direction.

The ratio z/H1 or z/H2 of the height z of the fins to the height H1 or H2 of the side rails is, for example, in a range between 1.5 and 11, or lesser or greater, and preferably in a range between 3 and 8 or 6 and 8. This is the case for any of the profile shapes shown in FIGS. 3 and 5*a-c*.

Figure 4:
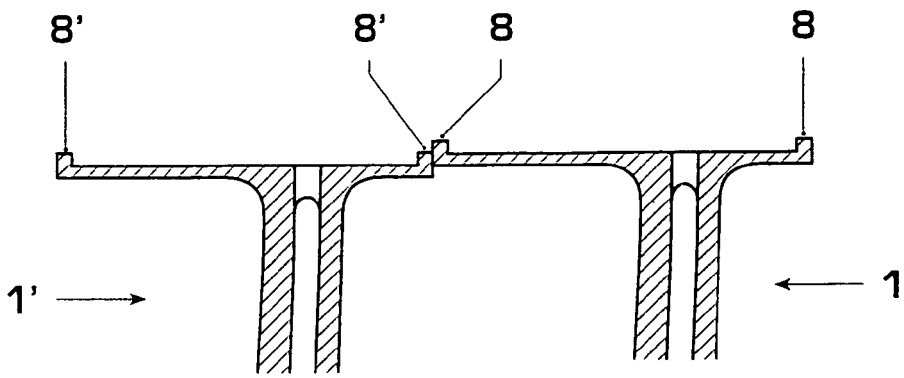
FIG. 4 shows two exemplary adjacent blades with side rails.

FIG. 4 shows the blade 1 with blade shroud of FIG. 3 having side rail 8 and the shroud of an adjacent blade 1' having side rail 8' in a slight mismatch of the radial position of the side rails 8 and 8'. Due to sufficient height of the side rails 8, 8' the mismatch does not lead to a gap, where hot gas could pass through.

Figure 5A:
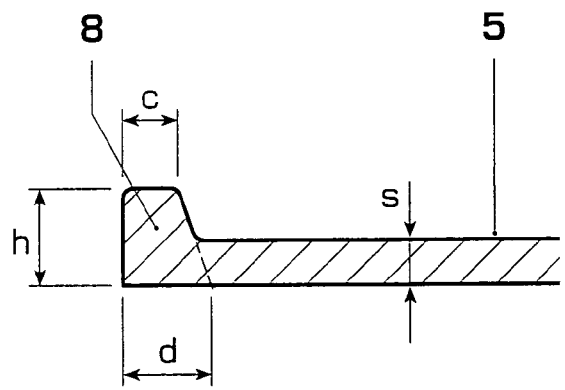
FIGS. 5a, b, c show detailed cross-sectional views of the side rails according to the several different embodiments.
Figure 5B:
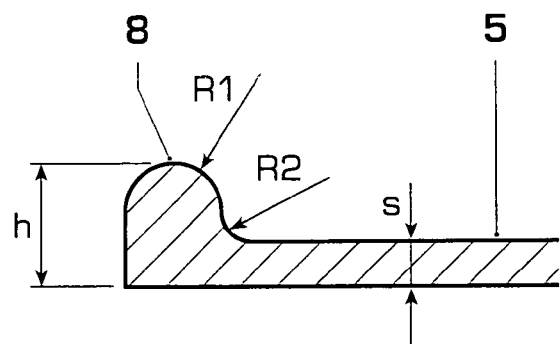

FIG. 5*b* shows, in the same cross-section as FIG. 3, a second exemplary embodiment of the side rail. The profile of the side rail 8 has a semi-circular shape having a radius R1. The transition from side rail to the platform 5 is shaped with a curvature having a radius R2. The two radii are in a ratio R2/R1 in the range between 0.1 and 3.5, or lesser or greater. This curvature can be advantageous with respect to mechanical strength and avoids sharp corners, where high density of tension or loading could occur and cracks could be initiated.

Figure 5C:
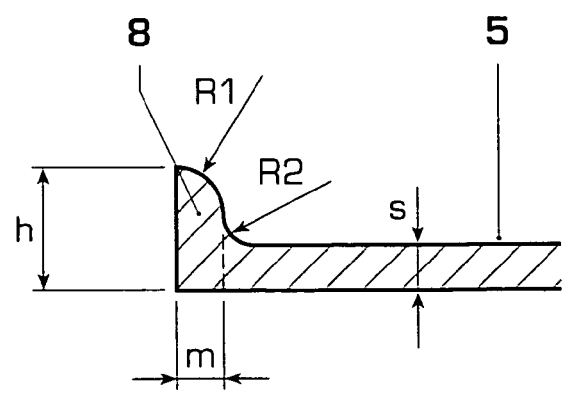

FIG. 5*c* shows a profile according to a third exemplary embodiment having an approximately quarter circular shape with radii R1 and radius of curvature R2 in the transition to the platform 5. The same ratios of R2/R1 can hold as given for the profile according to FIG. 5*a*. The dimension m is defined as the distance normal to the side face of the rail between the platform edge and the transition from R1 to R2. The ratio m/R1 is in a range from 0.35 to 2, or lesser or greater.

In the embodiments of both FIGS. 5*b* and 5*c* the side rail has a total height h, where the ratio of h/R1 can be in the range between 3 and 5, or lesser or greater, for a wall thickness s for the platform as given above.

FIG. 5*a* shows a further exemplary embodiment. The side rail 8 has a profile in the shape of a trapezoid. It has dimensions c and d for the width of the upper or radially outer surface and a width of the trapezoid at its base, which relate to one another according to d/c in the range between 0.2 and 5, or greater or lesser. The trapezoid has a height h, which relates to the widths c and d according to 2h/(c+d) having values in the range between 1 and 6, or greater or lesser. The platform thickness s is again in the range as given above. This shape is particularly suitable as it can be easy to cast.

FIG. 6 shows a side view of the blade with fins 6 and 7 and side rail 8. The transitions from fins to side rails are rounded, again for reasons of mechanical strength and in view of avoiding cracks emanating from sharp corners. The radii of curvature $Rf_1$ and $Rf_2$ are in the range from 1 mm to half the value of the fin height z.

In the embodiments described herein, the wall thickness s of the platform may be either a constant value within the range, for example, from 0.8 to 4 mm or tapered within the same value range.

The tips of the fins as well as the faces of adjacent shrouds, which are in contact with one another during operation of the gas turbine (also known as coupling faces), may in any of the mentioned embodiments be coated with wear protection face coatings such as chromium carbide CrC or cubic borium nitride CBN in order to, for example, improve the wear resistance of the side rails.

The hot-gas side of the blade shroud can be suitably coated with a oxidation/corrosion protection coating and/or a thermal protection coating such as a thermal barrier coating (TBC) of the state of the art. The blade shroud can be manufactured by any suitable means, for example by casting, with possible subsequent machining. Further possible methods of manufacturing are welding, brazing, casting, plasma-spraying, machining, stereo lithographic, and galvanic methods, of which one or more can be applied.

The blade shroud may, depending on its location within the gas turbine, furthermore be either uncooled or cooled by state of the art means for film cooling, convective cooling, impingement cooling from the shroud itself, stator or other known methods.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

TERMS USED IN FIGURES 1 blade
2 blade root
3
4 blade shroud
5 blade shroud platform
6 first fin
7 second fin
8 side rail H height of rectangular side rail
B width of rectangular side rail
h height of round side rail
m width of round side rail
s wall thickness of platform
R1 radius of curvature of round side rail
R2 transition radius of curvature
c,d width of trapezoidal side rail
$Rf_1$, $Rf_2$ transition radius of curvature from fin to side rail
z fin height

The invention claimed is:

1. A gas turbine blade shroud comprising:
a platform; and
one or more fins extending radially outward from the platform wherein side rails extend radially outward and along one or both edges of the platform that face the platform of an adjacent blade in a blade row and the side rails have an outer profile in the shape of a semi-circle or approximately a quarter of a circle at a radially outer end of the side rails;
wherein the side rails with a semi-circular profile have a height (h) and a radius of curvature (R1) where the ratio of height (h) to radius of curvature (R1) is in a range from 3 to 5, and wherein there is a curved transition from the side rail to the platform and the curved transition has a radius of curvature (R2) where a ratio of the radius of curvature (R2) of the transition to the radius of curvature (R1) of the side rail profile is in a range from 0.1 to 3.5.

2. A gas turbine blade shroud comprising:
a platform; and
one or more fins extending radially outward from the platform wherein side rails extend radially outward and along one or both edges of the platform that face the platform of an adjacent blade in a blade row and the side rails have an outer profile in the shape of a semi-circle or approximately a quarter of a circle at a radially outer end of the side rails;
wherein the approximately quarter-circular side rails have a width (m) and a radius of curvature (R1) where a ratio of the width (m) to the radius of curvature (R1) is in a range from 0.35 to 2.

3. A gas turbine blade shroud comprising:
a platform; and
one or more fins extending radially outward from the platform, wherein side rails extend radially outward and along one or both edges of the platform that face the platform of an adjacent blade in a blade row and the side rails have a polygonal profile shape having an upper width (c) and a base width (d), where a ratio d/c of the base width (d) to the upper width (c) is in a range from 0.2 to 5, and the side rails have a height (h) where a ratio of 2h/(c+d) is in a range from 1 to 6;
wherein the fins have a height (z) and the side rails have a height (H, h) where a ratio (z/h, z/H) of the height (z) of the fin to the height (H, h) of the side rail is in a range from 1.5 to 11.

4. A gas turbine blade shroud comprising:
a platform; and
one or more fins extending radially outward from the platform, wherein side rails extend radially outward and along one or both edges of the platform that face the platform of an adjacent blade in a blade row and the side rails have a polygonal profile shape having an upper width (c) and a base width (d), where a ratio d/c of the base width (d) to the upper width (c) is in a range from 0.2 to 5, and the side rails have a height (h) where a ratio of 2h/(c+d) is in a range from 1 to 6;
wherein the blade shroud comprises a curved transition ($Rf_1$, $Rf_2$) from the fins to the side rails where the radius of curvature of the transition ($Rf_1$, $Rf_2$) is in a range from 1 mm to half of a value of the height (z) of the fins.

5. A gas turbine blade shroud according to claim 3, wherein tips of the fins and coupling faces of the blade shroud are coated with a wear protection coating.

6. A gas turbine blade shroud according to claim 3, wherein a hot-gas side of the blade shroud is coated with a thermal protective coating.

7. A gas turbine blade shroud according to claim 3, wherein a hot-gas side of the blade shroud is coated with an oxidation/corrosion protection coating and/or a thermal barrier coating.

8. The gas turbine blade shroud according to claim 3, wherein (d), (c), and (h) are chosen such that the polygon is a trapezoid.

9. The gas turbine blade shroud according to claim 3, wherein (d), (c), and (h) are chosen such that the polygon is a rectangle.

10. The gas turbine blade shroud according to claim 3, wherein the polygon comprises two parallel sides that run perpendicular to the length of the side rail and perpendicular to the radial direction.

11. The gas turbine blade shroud according to claim 3, wherein (h) is measured in the radial direction.

12. The gas turbine blade shroud according to claim 1, wherein tips of the fins and coupling faces of the blade shroud are coated with a wear protection coating.

13. The gas turbine blade shroud according to claim 1, wherein a hot-gas side of the blade shroud is coated with a thermal protective coating.

14. The gas turbine blade shroud according to claim 1, wherein a hot-gas side of the blade shroud is coated with an oxidation/corrosion protection coating and/or a thermal barrier coating.

15. The gas turbine blade shroud according to claim 2, wherein tips of the fins and coupling faces of the blade shroud are coated with a wear protection coating.

16. The gas turbine blade shroud according to claim 2, wherein a hot-gas side of the blade shroud is coated with a thermal protective coating.

17. The gas turbine blade shroud according to claim 2, wherein a hot-gas side of the blade shroud is coated with an oxidation/corrosion protection coating and/or a thermal barrier coating.

18. The gas turbine blade shroud according to claim 4, wherein tips of the fins and coupling faces of the blade shroud are coated with a wear protection coating.

19. The gas turbine blade shroud according to claim 4, wherein a hot-gas side of the blade shroud is coated with a thermal protective coating.

20. The gas turbine blade shroud according to claim 4, wherein a hot-gas side of the blade shroud is coated with an oxidation/corrosion protection coating and/or a thermal barrier coating.

* * * * *